Jan. 4, 1944.     C. B. BOGUE     2,338,400
MACHINE FOR VIEWING AND SEGREGATING FILM
Filed Oct. 7, 1941     3 Sheets-Sheet 1
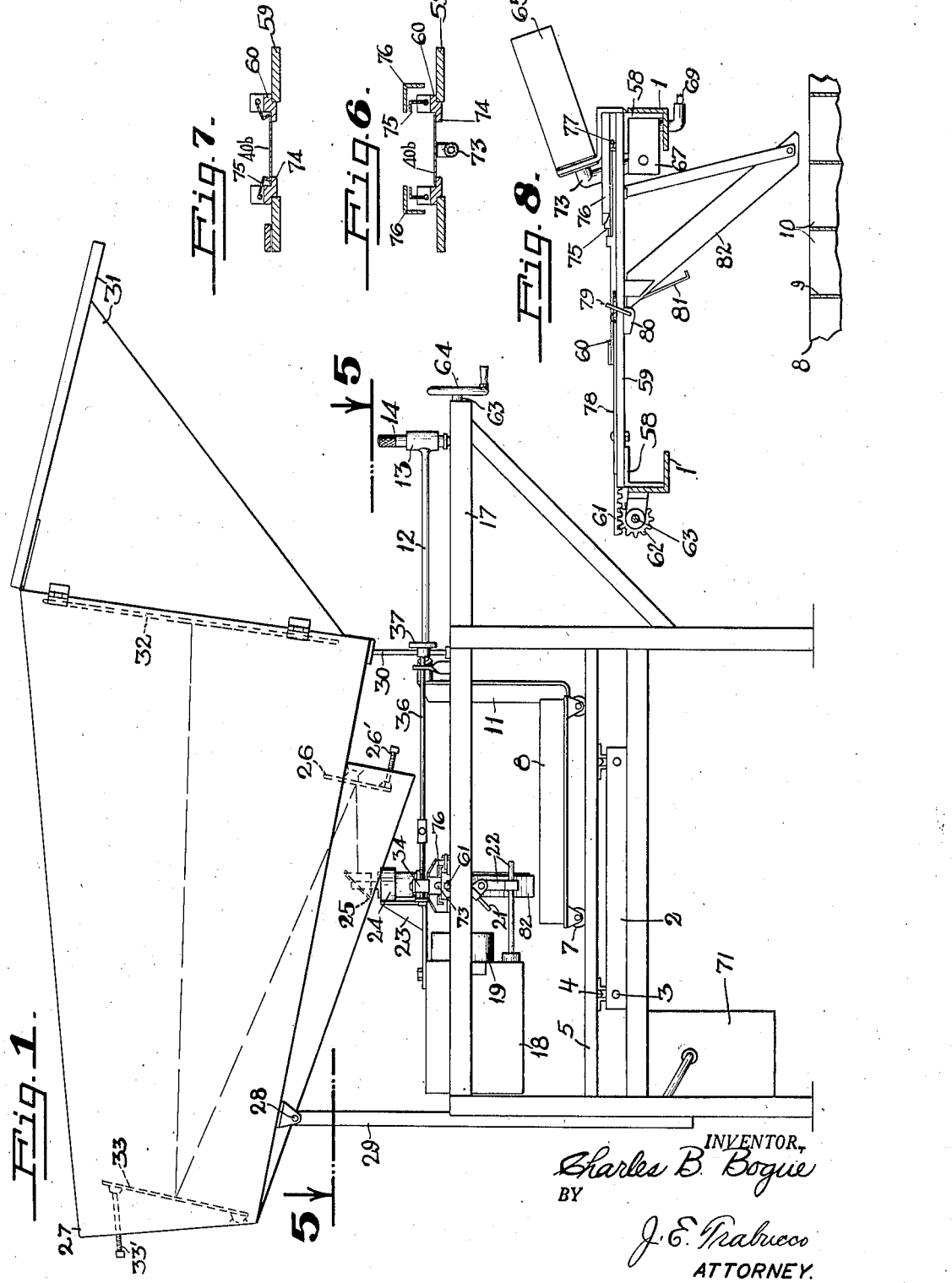
INVENTOR,
Charles B. Bogue
BY
J. E. Trabucco
ATTORNEY.

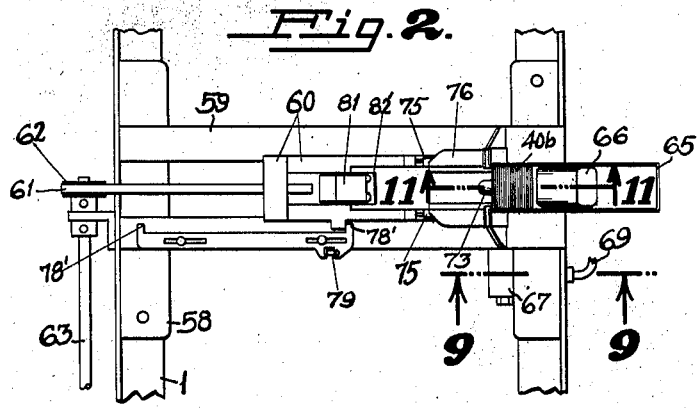
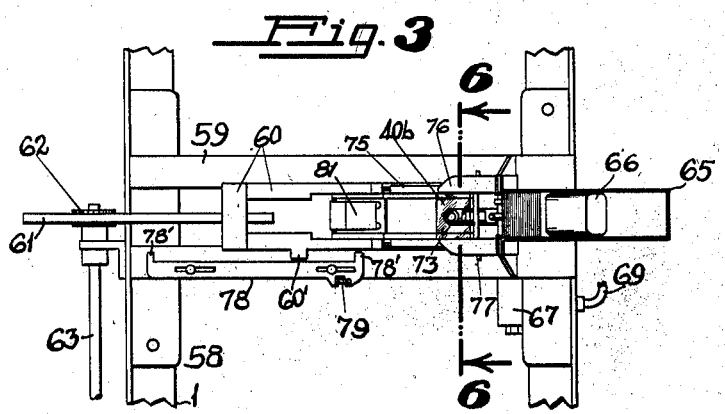
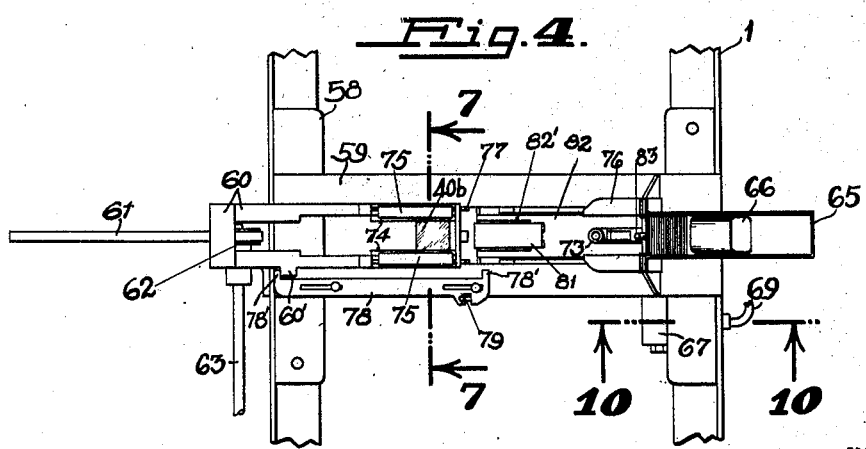

Jan. 4, 1944.　　　　C. B. BOGUE　　　　2,338,400
MACHINE FOR VIEWING AND SEGREGATING FILM
Filed Oct. 7, 1941　　　3 Sheets-Sheet 3
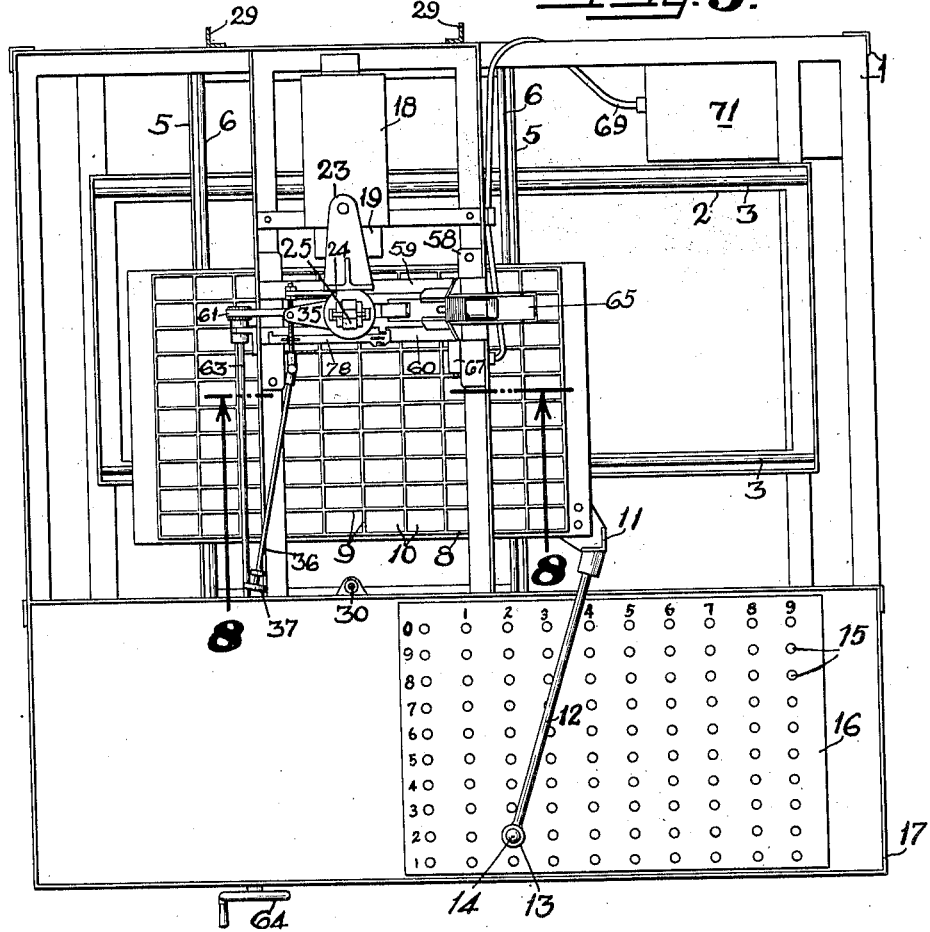
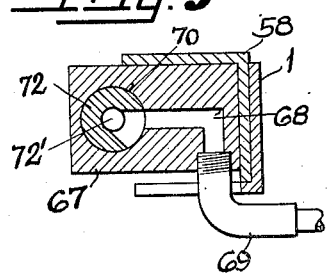
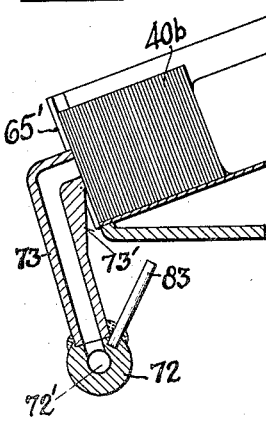
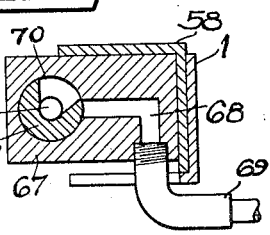
INVENTOR,
Charles B. Bogue
BY
J. E. Trabucco
ATTORNEY.

Patented Jan. 4, 1944

2,338,400

UNITED STATES PATENT OFFICE 2,338,400

MACHINE FOR VIEWING AND SEGREGATING FILM

Charles B. Bogue, San Francisco, Calif.

Application October 7, 1941, Serial No. 413,931

4 Claims. (Cl. 209—122)

This invention relates to an improved machine for viewing and segregating parts or segments of photographic film.

The present invention is directed particularly to an improved method of viewing, cutting and segregating cinematographic film segments having photographic reproductions of a number of recorded documents relating to property transfers or the like, whereby in making use of such classified and segregated film segments one may readily select and view, by means of a projector, any one of the several reproduced documents for the purpose of passing on questions relating to title. In carrying out my invention a moving picture camera is first employed to produce successive exposures on a negative film of a number of recorded documents, there also being simultaneously photographed a suitable mark, which, when a positive film is made from the negative, will serve to intercept a beam of light proceeding to a photo-electric cell and thereby cause the operation of an electrical film cutter to cut the film into a plurality of segments.

Another object of my invention is to provide a machine of the kind characterized having novel means for separately viewing and segregating a number of severed parts of exposed film into certain groups.

Other and further objects of my invention will be pointed out hereinafter, or will be indicated in the appended claims, or will be obvious to one skilled in the art upon the understanding of the present disclosure. For the purpose of this application I have elected to show herein certain forms and details of a machine for viewing, cutting and segregating photographic film which is representative of my invention; it is to be understood, however, that the embodiment of my invention herein shown and described is for the purpose of illustration only, and that therefore it is not to be regarded as exhaustive of the variations of the invention.

In the accompanying drawings:

Fig. 1 is a side elevation of that part of my machine which is used to separately view and segregate the severed parts of a film;

Fig. 2 is a detailed view of that part of the machine shown in Fig. 1 which is adapted to successively deposit a number of stacked film segments onto a supporting member for viewing and segregating purposes, the mechanism being shown at the commencement of the cycle;

Fig. 3 is a similar view showing the mechanism in a position where a film segment is about to be deposited onto its supporting member;

Fig. 4 is a similar view showing the mechanism in a position after the film segment has been deposited onto its supporting member and the latter has been moved to a position whereby the image projecting apparatus is operatively associated with the said film segment;

Fig. 5 is an enlarged sectional view taken on the line 5—5 of Fig. 1;

Fig. 6 is a sectional view taken on the line 6—6 of Fig. 3;

Fig. 7 is a sectional view taken on the line 7—7 of Fig. 4;

Fig. 8 is a sectional view taken on the line 8—8 of Fig. 5;

Fig. 9 is a sectional view taken on the line 9—9 of Fig. 2;

Fig. 10 is a sectional view taken on the line 10—10 of Fig. 4;

Fig. 11 is a sectional view taken on the line 11—11 of Fig. 2.

In carrying out the present invention I provide a supporting frame 1 made preferably from angle irons which are arranged to suitably support the various parts of the machine. Mounted on the frame beneath the top part thereof is a rectangular shaped supporting structure 2 made preferably from angle irons, and having a pair of parallel roller guide rods 3 supported by its lateral ends. Movably positioned on the guide rods 3 are rollers 4 which are carried by and serve to support a rectangular frame 5. Secured to the forward and rear ends of the frame 5 are another pair of roller guide rods 6 which are positioned at right angles to the first mentioned rods 3. Rotatably positioned on the guide rods 6 are rollers 7 which are carried by and serve to support a rectangular tray 8 which is divided by a series of intersecting partition members 9 into a plurality of open compartments 10. The tray 8 may be moved back and forth in a direction parallel to the rods 6, and it may also be moved together with the rectangular frame 5 in a direction parallel to the rods 3. Thus the tray may be moved to positions where any one of its compartments 10 is positioned to receive a severed segment of a film delivered by an overlying film delivery chute, as will be later described. Secured to a corner of the tray 8 is an upright member 11 having a forwardly disposed horizontal rod 12 rigidly secured to its upper end. The forward free end of the rod 12 is provided with a sleeve 13 through which a vertical pointer 14 movably extends. The pointer is capable of being manually lifted so its lower pointed end may be disengaged from the particular groove 15 of a rectangular board 16 with which it engages. The board 16 is securely mounted on a forwardly disposed table 17 supported by the frame 1. The outside shape and size of the board 16 corresponds substantially to the shape and size of the tray 8, and the grooves 15 are arranged in accordance with the relative positions of the compartments 10. The transverse rows of grooves 15 are successively marked by numerals appearing on the left hand side of the board, and similarly, the various rows of grooves commencing from the rear and proceeding forwardly are also suitably marked. Each of the grooves 15 is associated with a particular compartment 10 of the tray 8, and while the various compartments are not shown on the drawings as being consecutively numbered, it is contemplated that they be so designated. The moving of the pointer 14 to a position where it engages with a certain groove 15, will simultaneously move the tray 8 to a position where a corresponding compartment 10 is positioned beneath the film delivery chute. On the drawings the pointer 14 is shown in engagement with a particular groove 15 which happens to be known as Number 22, and it is understood by observing the particular position of the pointer that a certain compartment 10 which is also known as Number 22 is positioned beneath the film delivery chute.

Supported at the rear side of the frame 1 is a housing 18 within which a source of light (not shown) is positioned. A lens tube 19 holding a lens (not shown) projects forwardly from the light housing, and positioned to intercept the light rays passing through the said lens is a mirror 21, the latter being suitably mounted on a supporting structure 22 secured to the housing. Mounted on a bracket 23 which is secured to the light housing 18 is a vertically disposed lens tube 24 which has a suitable lens (not shown) mounted therein. The lens tube is positioned directly above the mirror 21 and the lens therein is disposed with its axis at right angles to the said mirror. Supported above the lens tube 24 is a light reflecting prism 25 which is mounted to reflect the light rays passing upwardly through the vertical lens tube in a forward direction and onto an adjustable mirror 26. The mirror 26 is mounted inside and at the lower side of a suitably shaped enclosure 27. The rear end of the enclosure is pivotally mounted as at 28 on the upper end of vertical posts 29 secured to the frame 1, and the said enclosure's forward end is normally supported by a detachable upright brace 30. The forward end of the enclosure is provided with hinged side wings 31 which shield a frosted translucent panel 32 mounted at the forward end of the said enclosure from extraneous light rays. At the rear of the enclosure is an adjustable mirror 33 which is positioned to intercept and reflect the light rays proceeding from the mirror 26 onto the translucent frosted panel 32. Suitable adjusting screws 26' and 33' are associated with the mirrors 26 and 33, respectively, for adjusting purposes. When not being used the enclosure 27 may be swung rearwardly about its pivot 28 to a position where it does not overly the frame 1.

The lens tube 24 comprises a lower adjustable section which is capable of being rotated for the purpose of bringing the lens it mounts into proper focus with respect to the mirror 21 and the prism 25. A nut 34 (see Figs. 1 and 5) connected by a bar 35 to the lower rotatable section of the lens tube 24 is operatively engaged by the threaded section 36' of a forwardly disposed rotatable shaft 36. The turning of a hand piece 37 provided on the forward end of the shaft 36 causes the rotation of the said shaft and the movement of the nut 34 backwardly or forwardly, thereby causing the lower section of the lens tube 24 to be turned so as to adjust the position and focus of the lens carried by the latter.

After a number of film segments 40b have been suitably segregated and grouped, it may be found desirable to again separate the grouped segments and re-arrange them in accordance with an index or planned classification. Forming a part of a sub-frame 58 mounted on the frame 1 are two parallel supporting members 59 upon which a rectangular open frame 60 is slidably mounted. The frame 60 is reciprocated by means of a rack 61 and pinion 62, the rack being secured at one end to the said frame and the pinion being secured to a forwardly disposed shaft 63 which is provided with a hand wheel 64.

Mounted in an inclined position on the sub-frame 58 by means of a suitable bracket is an inclined chute 65 which is adapted to hold a number of stacked film segments 40b. The lower end of the chute 65 is provided with opposed inwardly protruding side members 65' which engage the opposite side edges of the bottom film segment, thereby normally preventing the stacked film segments from dropping from the inclined chute. The bottom film segment is adapted to be sufficiently flexed to be released from engagement with the inwardly protruding members 65' when a downward and outward pull is exerted thereon, as will be presently described. A weight member 66 resting on the upper end of the stack of film segments serves to move the stack downwardly so the succeeding segment firmly engages with the inwardly protruding members 65' when the bottom segment has been removed from the stack.

Mounted on the sub-frame 58 beneath and to one side of the lower end of the chute 65 is a valve block 67 having a channel 68 which leads from a tubular conduit 69 to a valve opening or seat 70. The tubular conduit 69 leads to suction device 71 which is adapted to withdraw air through the conduit from the valve opening 70. Rotatably mounted in the valve opening 70 is a valve member 72 which has a nozzle 73 secured thereto. The opening through the nozzle communicates with an axial opening 72' in the valve member, and the said axial opening has a gradually enlarged right angle extension which is adapted to be brought into communication with the channel 68 when the valve member 72 is moved to an open position. When the valve member 72 is in the position shown in Figures 2, 9 and 11, air may be withdrawn through and from the nozzle, the valve member, the channel 68, and the conduit 69 by the suction device 71. The intake end of the nozzle 73, when the valve is open, is in engagement with the bottom film segment 40b, and by reason of the suction of the air from the nozzle, the said film segment is drawn to and thereby firmly engaged by the said nozzle. When the nozzle 73, along with the valve member 72, is turned in a counter-clockwise direction (Fig. 11), the bottom film segment 40b is pulled outwardly and becomes sufficiently flexed to be released from the inwardly protruding members 65' of the chute 65.

When the open slidable frame 60 is near or at its extreme right hand position (Figs. 2, 3 and 8), the nozzle 73 projects upwardly through the opening in the said frame, and when in such a position one of the opposite ends of said frame is in engagement with the said nozzle. In such a position the open end of the nozzle is in engagement with the bottom film segment 40b and the channel through the valve 72 is open. The nozzle 73, near its intake end, is provided with an inclined surface 73' (see Fig. 11) upon which the engaging end of the open frame 60 is adapted to slide. As the slidable open frame 60 is moved to the left by the turning of the hand wheel 64 in a counter-clockwise direction, the engaging end of the said open frame moves the nozzle 73 about its pivot in a direction away from the lower end of the inclined chute 65. The bottom film segment 40b is carried with the nozzle from the chute to a position where it is in a substantially horizontal position (see Fig. 3). During the major portion of this movement of the nozzle the valve 72 has remained open, but as the said nozzle approaches the position where the film is horizontally disposed, the said valve gradually closes, until finally the suction through the valve and nozzle is discontinued, and the said film segment is then adapted to become freed from the nozzle.

The open frame 60 is formed at its opposite sides with inwardly protruding shoulders 74 that provide seats (see Figs. 6 and 7) upon which the side edges of a film segment 40b may rest when the said film is moved by the nozzle 73 to a horizontal position. When the open frame 60 has been moved to a position where the film segment has been deposited on the shoulders 74, the nozzle 73 is in a position whereby the engaging end of the said open frame may freely slide past the open end of the said nozzle.

Pivotally mounted at their opposite ends on suitable upwardly protruding members formed on the opposite sides of the open frame, are two film segment clamps 75. The free inwardly disposed edges of the clamps 75 are urged by suitable springs (not shown) toward the shoulders 74 upon which the opposite edges of the film segments are normally seated. Suitable means is provided for maintaining the film segment clamps 75 in positions where they do not interfere with the depositing of a film segment on the shoulders 74. This means includes two oppositely disposed side wings 76 mounted on the supporting members 59. The said side wings near their left hand edges have their outside edges angularly disposed. Slidably engaging with the outside edges of the side wings are small substantially right angle rods 77 which are rigidly secured at ends thereof to their respective clamps 75 and which have upstanding parts engaging with the edges of the said side wings. The side wings 76 are so disposed and so shaped that when a film segment is in the process of being moved to the open frame from the chute 65, the projecting rods 77 are held by the said side wings (see Fig. 3) against the tension of the springs of the clamps, in positions whereby the said clamps are raised above and held away from the shoulders 74. Just after the open frame 60 has been moved to a position in which a film segment is deposited on the shoulders 74, the angular rods 77 of the clamps 75 will slide from the angular or beveled edges of the side wings 76, thereby allowing the said clamps to be further turned by their associated springs to positions where they engage with the side edges of the film segment, which film segment is thereby normally held against displacement. The reciprocation of the open frame 60 in the opposite direction will bring the angular rods 77 again into engagement with the side wings 76 and thereby cause the clamps 75 to pivotally move to raised positions.

As the open frame 60 is moved to the left, a side projection 60' thereon is carried into engagement with one of two end protuberances 78' provided on a slidable bar 78 which is mounted on one of the supporting members 59 of the sub-frame 58. The slidable bar 78 is slotted near its right hand end and movably positioned in its slot is the upwardly projecting end of a pivoted rod 79. The pivoted rod 79 extends across and beneath the opening in the open frame 60 and it is supported at its ends on lugs 80 (Fig. 8) secured to the underneath side of the supporting members 59. Rigidly secured at one of its ends to the pivoted rod 79 is a plate 81 having upturned fingers at its free end. As the slidable bar 78 is carried to the left with the open frame 60, the rod 79 is turned so as to bring the plate 81 into a substantially horizontal position, and there it remains until the rod is rotated in the opposite direction. When the open frame has reached the end of its leftward movement (Fig. 4) the film segment 40b will be in a position whereby it intercepts the light rays which are reflected upwardly by the mirror 21. The image appearing on the film segment is thereupon directed by means of the previously described arrangement of lenses and reflectors onto the translucent panel 32. The operator, by noting some predetermined characteristic appearing on the projected image will thereupon know which of the several compartments 10 of the tray 8 should be positioned to receive the film segment. The pivoted plate 81 is positioned centrally beneath the longitudinal opening in the open frame 60, and when in a horizontal position its upturned fingers are adapted to intercept the right hand edge of the film segment 40b as the said open frame is moved to the left. After the operator has viewed the projected image and has suitably positioned the tray 8 where a certain compartment thereof will receive the discharged film segment, the hand wheel 64 is turned in a reverse direction, thereby commencing the movement to the right of the open frame 60. Owing to the distance between the protuberances 78' on the slidable bar 78 the pivoted rod 79 and the plate 81 will not be pivotally moved until the open frame and the film segment 40b which the latter carries have traveled for some distance to the right. As the open frame is moved to the right, the film segment 40b is carried to a point where it encounters the upturned fingers of the plate 81. Not being able to proceed past the said fingers, the film segment slides from the shoulders 74 and drops onto the plate 81 as the movement of the open frame 60 is continued. When the open frame has reached a position where the depositing of the film segment 40b on the plate 81 has been accomplished, the right hand protuberance 78' of the slidable bar 78 will have been encountered by the side projection 60' of the said open frame, and the continued movement to the right of said open frame will carry with it the bar 78 and the upturned end of the pivoted rod 79. The consequent turning of the rod 79 causes the plate 81 with the film segment thereon to move to a downwardly inclined position. Positioned beneath the plate 81 is an inclined film chute 82 which has a slot 82' in its upper end through which the plate 81 may freely pass. The slot 82' is of such a width that the lateral edges of the film segment 49b encounter the chute, and as the plate 81 continues to move on through the said slot, the film segment is transferred to the said chute. The film segment thereupon drops into the particular compartment 10 of the tray 8, which happens to be beneath the lower end of the chute. The continued movement to the right of the open frame will cause the right hand end of the latter to encounter a projecting pin 83 secured to the valve member 72. The projecting pin 83, being disposed at an angle with respect to the nozzle 73, was moved with the valve member 72 during the initial part of the cycle to a position where it may be encountered by the end of the open frame as the latter is reciprocated to the right. When the open frame reaches the end of its movement to the right, the intake end of the nozzle 73 will again be positioned in contact with the bottom film segment 49b.

While my invention has been described with reference to recorded documents, it is to be understood that the same system and apparatus is capable of being successfully used for various purposes other than the example given.

Having described my invention, what I claim is:

1. In a machine for viewing and segregating photographic translucent film segments having images thereon, a light projector, a reciprocable film segment support arranged to support a film segment in a substantially horizontal position, means for successively transferring a number of film segments onto the support, means for moving the film support into operative position with respect to the light rays from the projector whereby the images on the film segments may be projected onto the viewing surface, an adjustable film segment holder having a plurality of compartments for receiving the film segments after the images are projected and viewed, and means for bodily adjusting the position of the film segment holder so the compartments thereof may be selectively positioned in accordance with certain characteristics appearing on the projected images to receive the film segments.

2. In a machine for viewing and segregating photographic film segments having images thereon, a holder for a plurality of stacked film segments, a film segment support arranged to support a film segment in a substantially horizontal position, light projecting means arranged to project images from the film segments onto a viewing surface while they are on the support, means for moving the film support to bring a film segment positioned thereon into operative relation with the light projecting means, means for successively transferring the film segments from the holder to the support, means for successively discharging the film segments from the support after the projection of the images onto the viewing surface, and a multiple compartment film segment holder arranged to selectively receive and group the discharged film segments according to certain characteristics appearing on the projected images.

3. In a machine for viewing and segregating photographic film segments having images thereon, a holder for a plurality of stacked translucent film segments, a movable film segment support, means for successively transferring the film segments from the holder to the support, means carried by the support for successively clamping the segments on the support, means for projecting images from the film segments onto a viewing surface while they are on the support, means for moving the film support to bring a film segment positioned thereon into operative relation with the image projecting means, and means for successively discharging the film segments from the support after the projection of their images onto the viewing surface.

4. In a machine for viewing and segregating photographic film segments having images thereon, a holder for a plurality of stacked film segments, a movable film segment support, means for successively transferring the film segments to the support, light projecting means arranged to project images from the film segments onto a viewing surface, means for successively discharging the film segments from the support after their images are projected onto the viewing surface, means for moving the support, and means synchronized with the support moving means for actuating the film segment transferring means and the film segment discharging means so only one film segment will be positioned on the support at a time.

CHARLES B. BOGUE.